Sept. 7, 1926.  
G. L. McCAIN  
1,599,381  
STEERING GEAR FOR MOTOR VEHICLES  
Filed Oct. 2, 1920
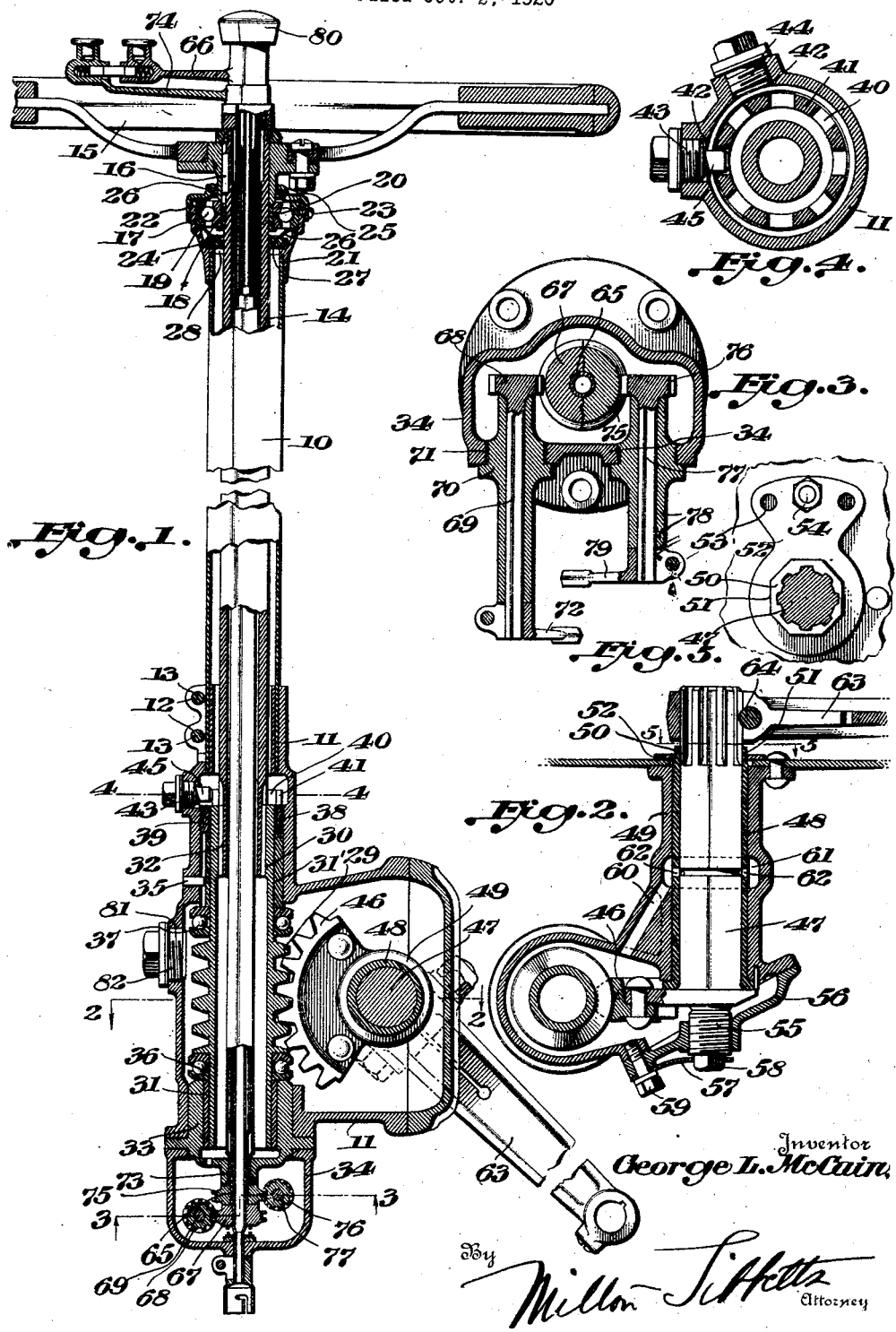
Inventor  
George L. McCain,  
By Milton Sitketts  
Attorney Patented Sept. 7, 1926.

1,599,381

UNITED STATES PATENT OFFICE.

GEORGE L. McCAIN, OF DETROIT, MICHIGAN.

STEERING GEAR FOR MOTOR VEHICLES.

Application filed October 2, 1920. Serial No. 414,351.

This invention relates to motor vehicles and more particularly, to steering mechanism therefor.

The invention has among its objects to provide a steering connection so constructed and arranged that the parts subject to wear are separate from the parts not subject to wear, and further, to connect the operative parts in such a manner that they may be readily assembled and taken apart.

Another object of the invention is to provide in steering mechanism of the character described means for adjusting the operative and motion transmitting elements to take up wear.

Another object of the invention is to provide steering mechanism that may be easily operated.

Further objects of the invention will appear from the following specification taken in connection with the drawings which form a part of this application, and in which:

Fig. 1 is a longitudinal sectional view of a steering column and connections embodying my invention;

Fig. 2 is a transverse sectional view taken substantially on line 2—2 of Fig. 1;

Fig. 3 is a transverse sectional view taken on line 3—3 of Fig. 1;

Fig. 4 is an enlarged detail view taken on line 4—4 of Fig. 1; and

Fig. 5 is a detail sectional view taken on line 5—5 of Fig. 2.

Referring to the drawings, I have illustrated steering mechanism comprising a steering column or tubular casing 10 having detachably secured thereto at its lower end a casing 11, the casings 10 and 11 housing the steering mechanism and motor control mechanism. As illustrated, the casing 11 is split at its upper end and is provided with a pair of outwardly extending ears or lugs 12 formed on the two ends of the split portion, these lugs being apertured to receive clamping bolts 13 by means of which the casing 11 is secured to the casing 10.

A steering post or shaft 14 is journaled in bearings carried by the casing 10 in a manner hereinafter described, and extends upwardly through this casing, having secured to its upper end a steering wheel 15, as by a key, indicated at 16. The upper end of the shaft 14 is journaled in a ball bearing 17 having inner and outer ball races 18 and 19 respectively. A flanged collar or sleeve 20 is interposed between the ball race 18 and the steering shaft 14, the shaft being slightly recessed to receive this collar. A sleeve 21 is brazed or otherwise secured to the upper end of the casing 10 and extends outwardly enclosing the outer ball race 19. A ring 22 is threaded into engagement with the free end of the sleeve 21, and the members 21 and 22 are also locked together by means of a screw 23 carried by the ring 22 and engaging the free end of the sleeve 21. Felt packings 24 and 25 prevent the escape of lubricant from the ball bearing and are retained in place by resilient washers 26. The lower packing 25 seats on a washer 27, which, in turn, engages an annular flange 28 formed on the inner surface of the sleeve 21.

From the above description it will be seen that the ball bearing 17 retains the steering post or shaft 14 in place and also facilitates the rotation of the steering wheel, providing an easily operable steering mechanism.

The steering mechanism about to be described utilizes a worm and sector for communicating the rotation of the steering wheel to the lever arm, which, in turn is connected to the vehicle's wheels, and in most of the steering mechanism of this type now on the market the worm has been formed integral with the steering shaft. However, it will be obvious that a much better grade of steel is necessary for the worm than for the steering post or shaft, and for this reason and for other reasons hereinafter set forth the worm and steering post have been made separate from each other. By making them separate it is also possible to replace the worm, should occasion require, and to detach the worm and sector and the casing enclosing these parts from the casing for the steering post and the parts connected thereto. It is also possible to adjust the worm in its bearings without changing the position of the remainder of the steering mechanism.

In order to accomplish these objects, the worm 29 is provided with an integral sleeve 30 mounted in bushings 31 and 31' carried by the casing 11, and the upper end of the sleeve is splined, as shown at 32, to the lower end of the steering post 14 and is adjustable longitudinally thereon. A flanged sleeve 33 is inserted in the lower end of the casing 11 between the casing and the bushing 31, and is secured to the casing 11 by means of suitable securing bolts (not shown) which also secure the cap 34 to the casing 11.

A dowel pin 35 is carried by the casing 11 and engages a longitudinally extending groove in the bushing 31' to prevent the rotation of this bushing, as it is longitudinally adjusted in a manner hereinafter set forth.

The end thrust of the worm 29 is taken up by a pair of ball thrust bearings 36 and 37, the bearing 36 being interposed between the lower end of the worm 29 and the bushing 31 and sleeve 33. At the upper end of the worm, the thrust bearing 37 is interposed between the upper end of the worm 29 and the adjustable bushing 31'.

In order to take up wear on the thrust bearings and to properly adjust these bearings, I have provided means for moving the bushing 31' longitudinally, it being understood that this movement also moves the worm 29 longitudinally. In order to accomplish this adjustment, a sleeve 38 is threaded, as shown at 39, into the interior of the upwardly extending portion of the casing 11 and this sleeve is provided at its upper end with a plurality of radially extending notches 40, these notches having positioned between them teeth 41. The casing 11 surrounding the notched or toothed upper end of the sleeve 38 is provided with a pair of transversely extending radial openings 42, and these openings are closed by a pair of plugs 43 and 44, one of the plugs having a reduced inwardly extending portion 45 adapted to enter one of the notches 40 in the sleeve 38. As illustrated in Fig. 4, the openings 42 in the casing 11 are so positioned angularly with respect to each other that a notch 40 in the sleeve 38 will be opposite one opening when a tooth 41 is opposite the other opening, and therefore the plug 43 with the extension 45 may be always positioned to engage one of the notches 40 by inserting this plug in one or the other of the openings 42. When the operator desires to adjust the worm 29 and bearings 36 and 37, the plugs 43 and 44 are removed and the sleeve 38 is rotated by inserting a suitable tool, such as a screw driver, in one of the openings 42. When the sleeve has been properly adjusted, the plug 43 may be inserted in the proper opening 42 to engage the extension 45 with one of the notches 40 and lock the sleeve in adjusted position.

In order to communicate the rotation of the steering wheel and worm to the wheels of the motor vehicle, the worm 29 is engaged by a sector 46 carried by a stud shaft 47 journaled in the bushing 48, which, in turn, is mounted in a bearing 49 formed in a laterally extending portion of the casing 11. Means has been provided for adjusting the shaft 47 and sector 46 with respect to the worm 29 in order to position the worm and sector teeth in proper mesh with each other. In order to accomplish this, the bushing 48 is made eccentric and is rotatably mounted in the bearing 49. One end of the bushing, as illustrated at 50, is extended beyond the casing and is provided with a plurality of flat surfaces 51, this end 50 being engaged by an adjusting member 52 having an opening conforming in shape to the end 50 of the bushing. By rotating the member 52, the bushing may be rotated, thereby moving the shaft 47 and sector 46 toward and from the worm 29. One end of the member 52 has a plurality of openings 53 disposed concentrically with respect to the center of the shaft 47 and the member 52 is retained in adjusted position by a bolt 54 carried by the casing 11, and adapted to pass through one of the openings 53.

The end of the shaft 47, to which the sector 46 is secured, is retained against endwise movement by means of a screw-threaded plug 55 carried by cover plate 56, which, in turn, is secured to the casing 11 and covers an opening through which the sector 46 and shaft 47 may be removed from the casing. A spring plate 57 engages a nut 58 formed on the free end of the plug 55 and prevents this plug from turning. The plate 57 is secured to the cover plate 56 by means of a bolt 59, this bolt also forming one of the means for securing the plate to the casing 11. Lubricant is conducted to the shaft 47 and bushing 48 through an inclined opening 60, which leads from the main portion of the casing 11 to an annular groove 61 in the bearing 49. Openings 62 in the bushing conduct the lubricant to the inner surface of the bushing.

A lever arm 63 is secured, as shown at 64, to the end of the shaft 47 opposite the sector 46 and this arm is connected in any suitable manner to the front wheels of the vehicle.

The steering column above described houses the usual nested, hollow or tubular shafts by means of which the throttle and spark are controlled, and in the particular embodiment of the invention illustrated, a tubular shaft 65 has secured to its upper end a control lever or handle 66 and to its lower end a worm 67. The worm 67 is engaged by worm gear 68 carried by a shaft 69 mounted in a transversely extending sleeve or bushing 70, which is screw-threaded, as shown at 71, to a portion of the cap 34 and extends outwardly therefrom. A lever arm 72 is secured to the free end of the shaft 69 and is connected by the usual links to the spark control mechanism.

A tubular shaft 73 surrounds the shaft 65 and is engaged at its upper end by a controlling handle or lever 74, and has secured to its lower end a worm 75 which meshes with a worm gear 76 carried by shaft 77 mounted in a bushing 78, the bushing being carried by the cap 34 in the same manner as the bushing 70. A lever arm 79 is secured to the free end of the shaft 77 and is connected in any suitable manner to the throttle of the motor. The shaft 65 above described also houses the electrical connections from a button 80 mounted on the upper end of the steering column to a signalling device, such as a horn, carried by the motor vehicle.

The casing 11 has formed therein an opening 81 to permit the insertion of lubricant into the casing, this opening being closed by a plug 82, as shown in Fig. 1.

From the above description it will be seen that my improved steering mechanism is so constructed and arranged that the parts subject to wear may be formed of a better grade of steel than the parts not subject to wear, and moreover, that the gearing for transmitting the rotary motion of the steering wheel to the motor vehicle wheels may be accurately and properly adjusted for most efficient operation, and that these parts may be easily and quickly detached from the remaining parts of the steering mechanism in order to replace the wearing parts, should this be necessary or desirable.

While I have in the above specification described one specific embodiment of my invention, it will be understood that the invention is capable of modification and that modifications and changes may be made in the construction and in the arrangement of the various cooperating parts without departing from the spirit or scope of the invention as expressed in the following claims.

Having described my invention, what I claim and desire to secure by Letters Patent is:

1. Steering mechanism comprising, in combination, a casing, a steering shaft carried thereby, a sleeve rotatably mounted in said casing and having a worm formed thereon, thrust bearings for said worm and sleeve, bushings for said sleeve engaging said thrust bearings and adjustable means carried by said casing for longitudinally adjusting said bushings and thrust bearings.

2. Steering mechanism comprising, in combination, a casing, a steering shaft carried thereby, a sleeve longitudinally adjustable on said shaft, a worm formed on said sleeve, and means positioned on the interior of said casing for longitudinally adjusting said sleeve and worm with respect to said shaft.

3. Steering mechanism comprising, in combination, a casing, a steering shaft mounted therein, a worm operatively connected to said shaft and longitudinally adjustable thereon, a sleeve threaded into the interior of said casing for adjusting said worm, said casing having openings therein to give access to said sleeve, and means adapted to be positioned in said openings and engage said sleeve to lock the sleeve in adjusted position.

In testimony whereof I affix my signature.

GEORGE L. McCAIN.